US006961836B2

(12) United States Patent
Weber et al.

(10) Patent No.: US 6,961,836 B2
(45) Date of Patent: Nov. 1, 2005

(54) METHOD AND APPARATUS FOR MAPPING STORAGE PARTITIONS OF STORAGE ELEMENTS TO HOST SYSTEMS

(75) Inventors: Bret S. Weber, Wichita, KS (US); Russell J. Henry, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 286 days.

(21) Appl. No.: 10/230,735

(22) Filed: Aug. 29, 2002

(65) Prior Publication Data

US 2004/0044871 A1 Mar. 4, 2004

(51) Int. Cl.$^7$ ............................................ G06F 12/00
(52) U.S. Cl. .................... 711/173; 711/111; 711/114; 711/153; 711/154; 711/158; 711/170; 711/173
(58) Field of Search ................... 711/111, 114, 153, 711/154, 158, 170, 173, 151

(56) References Cited

U.S. PATENT DOCUMENTS

| | | | | |
|---|---|---|---|---|
| 5,129,088 A | * | 7/1992 | Auslander et al. | ............. 711/1 |
| 5,430,855 A | | 7/1995 | Walsh et al. | |
| 5,519,844 A | * | 5/1996 | Stallmo | ...................... 711/114 |
| 5,784,702 A | * | 7/1998 | Greenstein et al. | ......... 711/173 |
| 6,029,231 A | * | 2/2000 | Blumenau | .................. 711/162 |
| 6,275,898 B1 | * | 8/2001 | DeKoning | ................... 711/114 |
| 6,363,470 B1 | | 3/2002 | Laurenti et al. | |
| 6,460,123 B1 | * | 10/2002 | Blumenau | ................... 711/162 |
| 6,529,201 B1 | | 3/2003 | Ault et al. | |
| 6,529,995 B1 | | 3/2003 | Shepherd | |
| 6,658,526 B2 | * | 12/2003 | Nguyen et al. | ............. 711/111 |
| 6,718,404 B2 | | 4/2004 | Reuter et al. | |
| 6,718,436 B2 | * | 4/2004 | Kim et al. | ................... 711/114 |
| 6,757,753 B1 | | 6/2004 | DeKoning et al. | |
| 6,772,231 B2 | | 8/2004 | Reuter et al. | |

OTHER PUBLICATIONS

The Compaq Enterprise Network Storage Architecture: An Overview, May 2000, pp. 1–22, Compaq Computer Corporation.

\* cited by examiner

*Primary Examiner*—Mano Padmanabhan
*Assistant Examiner*—Mehdi Namazi
(74) *Attorney, Agent, or Firm*—Duff, Borensen & Fishman LLP

(57) ABSTRACT

Systems and methods for generating, maintaining, and using merged partitions to process requests of one or more host systems to storage partitions of one or more storage elements. Each merged partition maps to one or more storage partitions defined within one or more of the storage elements. The storage elements may be combined to form a storage complex. Each storage element of the storage complex may include one or more storage volumes, such as an array of storage volumes. A system includes a map processor and an interface controller. The map processor is configured for mapping the storage partitions of each storage element to generate one or more merged partitions. The interface controller is communicatively connected to the host systems and to the map processor for processing the requests of the host systems to the storage volumes based on the merged partitions.

14 Claims, 3 Drawing Sheets

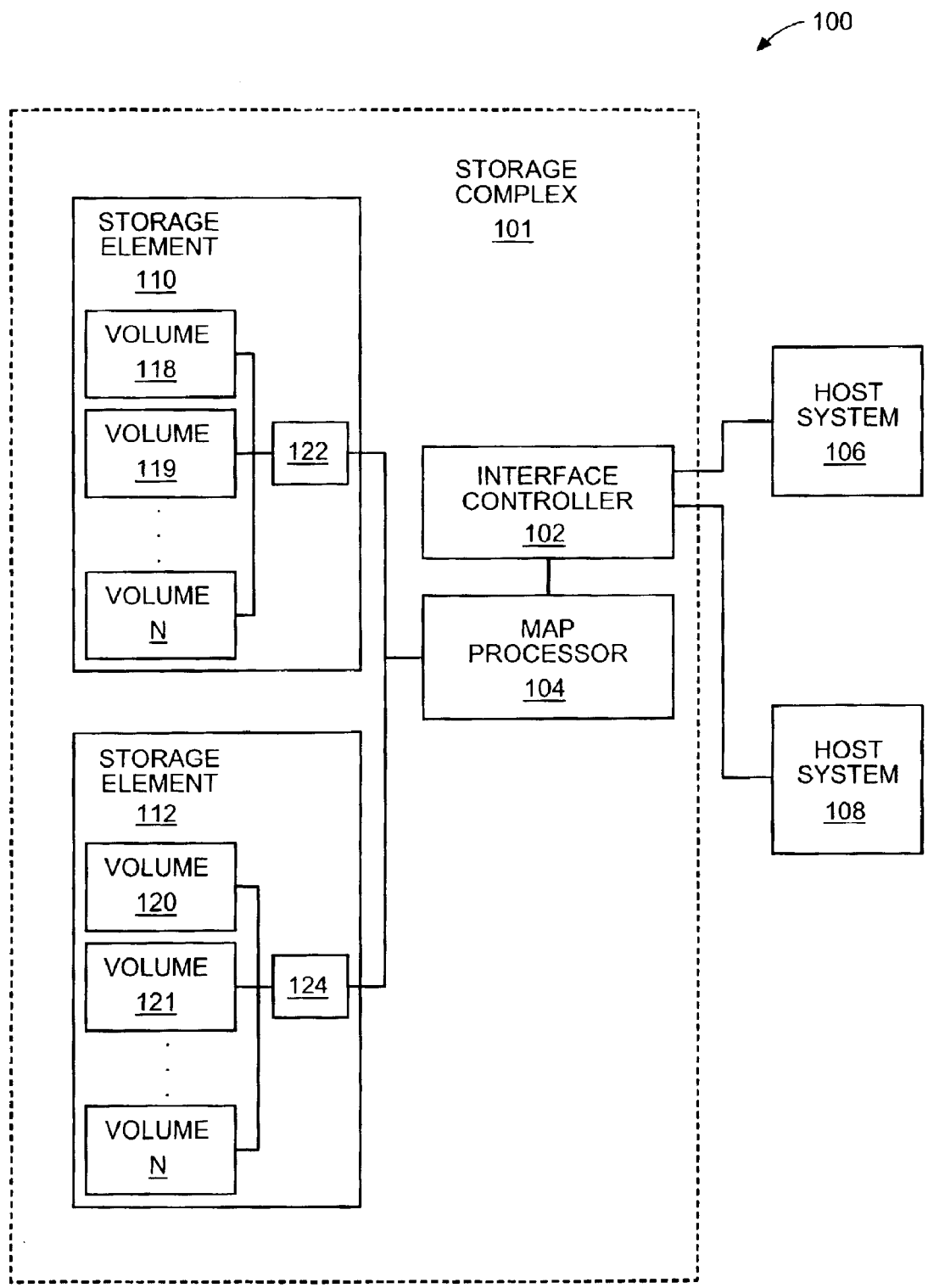
FIG._1

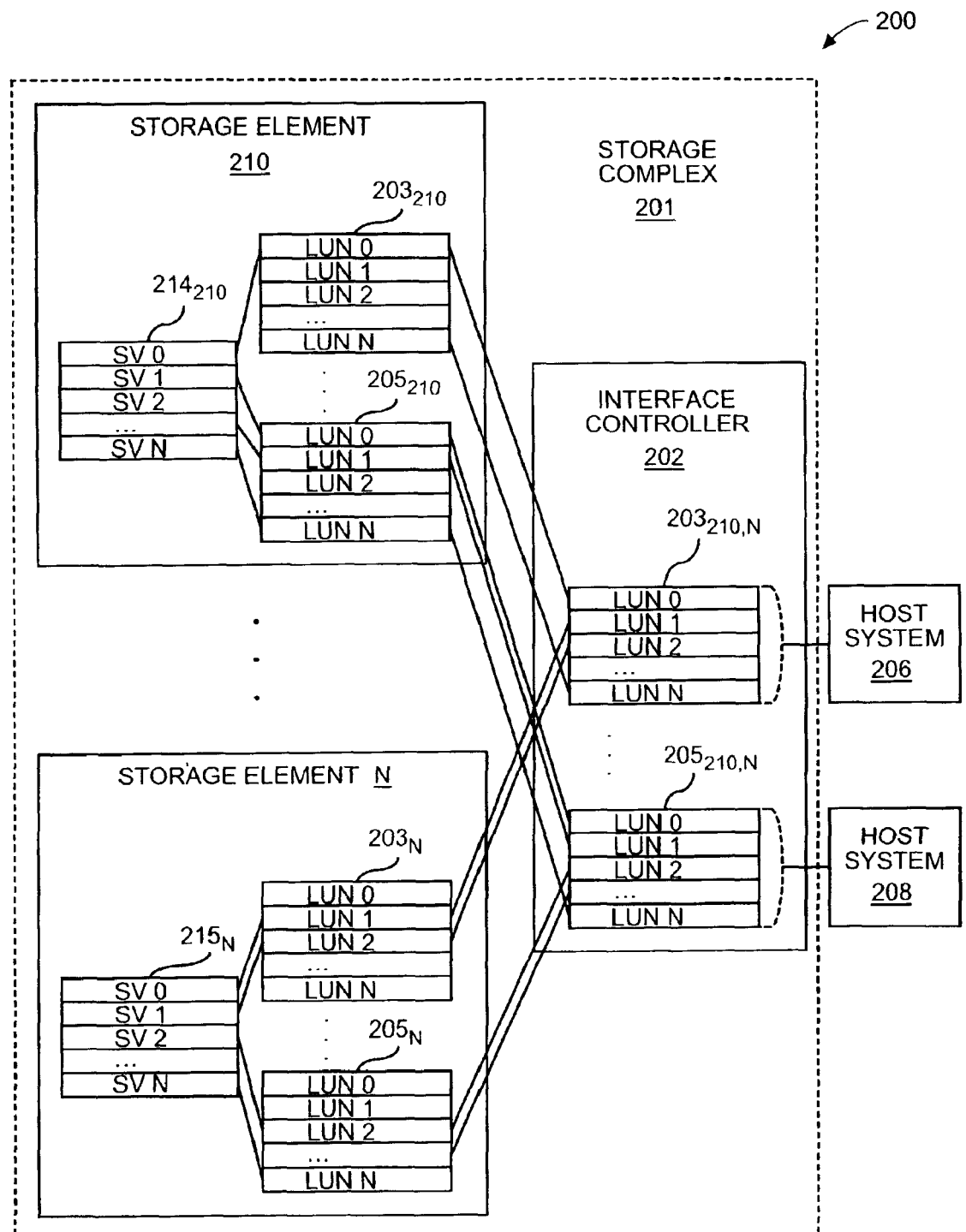
FIG._2

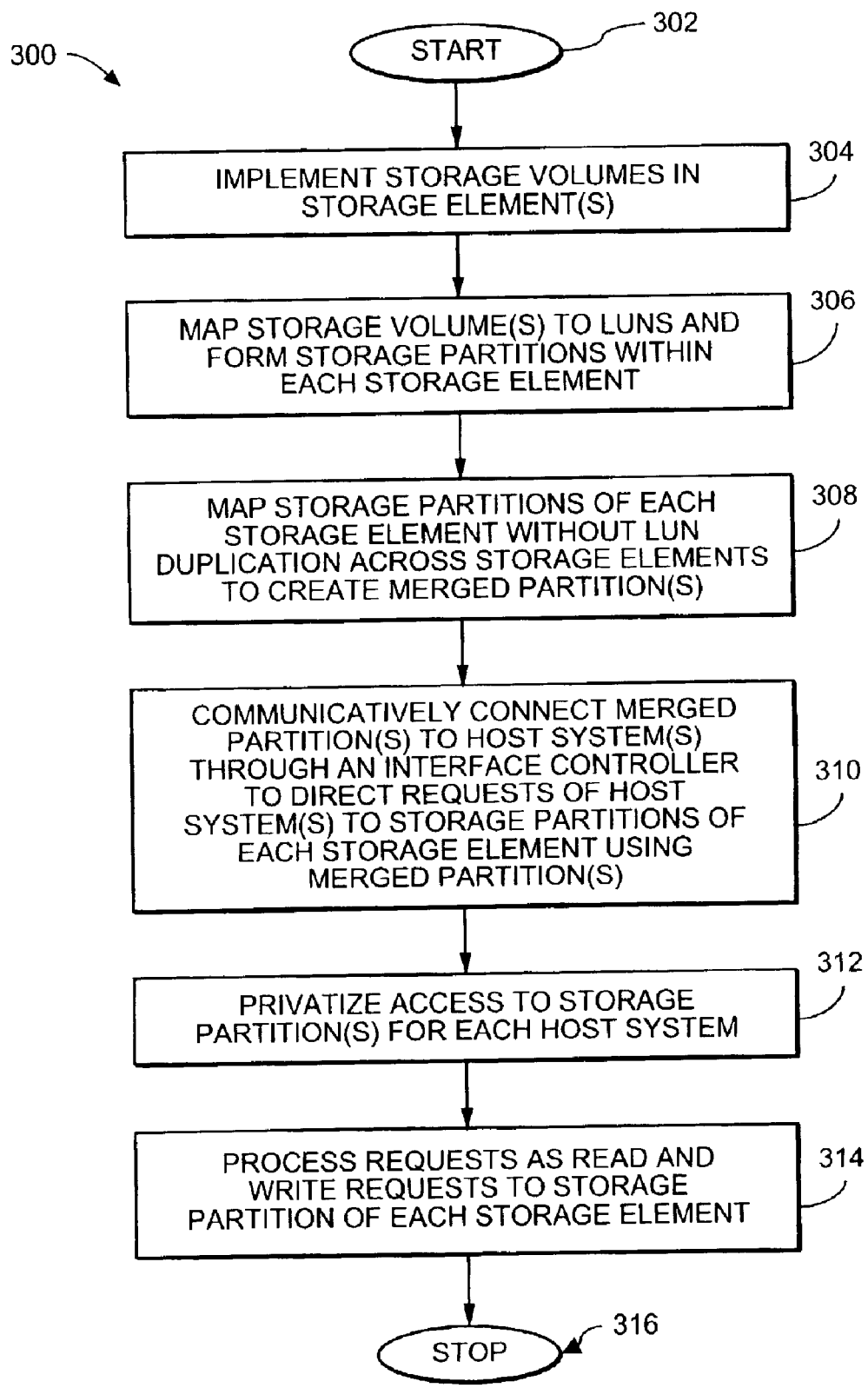
FIG._3

METHOD AND APPARATUS FOR MAPPING STORAGE PARTITIONS OF STORAGE ELEMENTS TO HOST SYSTEMS

BACKGROUND OF THE INVENTION

1. Field of the Invention

The present invention is generally directed toward mapping storage partitions of storage elements to host systems. More specifically, the present invention relates to abstracting storage partition mapping from the storage elements to an interface controller.

2. Discussion of Related Art

Large storage systems typically include storage elements that comprise a single storage device or an array of storage devices. The individual storage devices are accessed by host systems via Input/Output (I/O) requests, such as reading and writing, through one or more storage controllers. A user accessing the disks through the host system views the multiple disks as a single disk. One example of a large storage system includes a Redundant Array Of Independent Disks (RAID) storage system that has one or more logical units (LUNs) distributed over a plurality of disks. Multiple LUNs are often grouped together in storage partitions. Each storage partition is typically private to a particular host system, thus, LUNs of a particular storage partition are also private to the particular host system. Examples of the host systems include computing environments ranging from individual personal computers and workstations to large networked enterprises encompassing numerous, heterogeneous types of computing systems. A variety of well-known operating systems may be employed in such computing environments depending upon the needs of particular users and enterprises. Disks in such large storage systems may include standard hard disk drives as often found in personal computers as well as other types of storage devices such as optical storage, semiconductor storage, for example, Random Access Memory (RAM) disks, tape storage, et cetera.

Large storage systems have a finite capacity that may be scaled up or down by adding or removing disk drives as deemed necessary by the amount of needed storage space. However, since the capacity is finite, storage space of the storage system is limited to a maximum number of disks that can be employed by a particular storage system. Once the limit of disks is reached, storage space of the storage system can only be increased by replacement of the residing disks with disks that have more storage space, assuming the storage controller of the storage system allows higher capacity disks. Such a process is limited by disk technology advancements or by capabilities of the storage controller. However, many organizations demand larger storage capacity and cannot wait for these disk technology advancements or for changes to the storage controllers within the storage system.

One solution attempts to address the problem by employing multiple storage systems to increase the storage capacity. The storage capacity problem is, thus, simply solved through the scaling of storage space by the number of storage systems. However, the storage systems operate independently and, therefore, mandate that users access information of each storage system independently. As more storage capacity is employed, management of the information on multiple storage systems becomes cumbersome.

Organizations often demand increases to their storage capacity. For example, organizations that continually grow in size and/or technology have an ever-changing need to document and maintain information. These organizations also demand that the increases to their storage capacity be rapidly and easily implemented such that the stored information is rapidly accessible and flexibly configured for access within the organization. An unmanageable storage network of independent storage systems may impede or even prevent the management of the information stored in the storage systems.

As evident from the above discussion, a need exists for improved structures and methods for mapping storage partitions of storage elements to host systems, thereby making the storage elements more manageable.

SUMMARY OF THE INVENTION

The present invention solves the above and other problems and advances the state of the useful arts by providing apparatus and methods for processing requests of one or more host systems to storage partitions of one or more storage elements. More specifically, the invention provides for generating, maintaining and using merged partitions wherein each merged partition maps to one or more storage partitions defined within one or more of the storage elements.

In one exemplary preferred embodiment of the invention, a system processes the requests the host systems to storage partitions of one or more storage elements. The storage elements may be combined to form a storage complex. Each storage element of the storage complex may include one or more storage volumes, such as an array of storage volumes. The storage volumes may include any types of storage media including magnetic disk, tape storage media, CD and DVD optical storage (including read-only and read/write versions), and semiconductor memory devices (e.g., RAM-disks). The system includes a map processor and an interface controller. The map processor is configured for mapping the storage partitions of each storage element to generate merged partitions. The interface controller is communicatively connected to the host systems and to the map processor for processing the requests of the host systems to the storage volumes based on the merged partitions. For example, a storage element may have multiple storage volumes, such as computer disks, that are partitioned relative to a specific host system. The storage partitions of each storage element may be mapped to a merged partition relative to the specific host system. Thus two layers of mapping may exist, one that maps storage partitions of a storage element to the storage volumes within that storage element, and another that maps storage partitions of each storage element to the merged partitions within the interface controller. In this example, the merged partitions are abstracted forms of the storage partitions on the interface controller. The map processor may incorporate functionality of a communications switch and/or a router such that the requests may be routed to appropriate storage partitions based on the merged partitions.

In another exemplary preferred embodiment of the invention, the storage element includes a storage controller for processing the requests from the host systems to the storage partitions of the storage element. An example of one such storage controller may include a RAID storage controller. The requests may originate from multiple types of host systems.

The merged partition of the interface controller provides for access by each host system to the storage volumes of each storage element. For example, the interface controller may receive a request from a host system and process the request to an appropriate storage partition of one or more of the storage elements based on the merged partitions. Once processed for the appropriate storage partition, the mapped request may be processed again from the appropriate storage partition to an appropriate storage volume within the storage element.

In one aspect of the invention, a method is provided for processing requests of a host system to one or more storage elements, each storage element having one or more storage partitions. The method includes a step of mapping the storage partitions of each storage element to generate one or more merged partitions of the storage elements. The method also includes a step of communicatively connecting the merged partitions to the host system to process the requests of the host system to the storage partitions of each storage element using the merged partitions.

In another aspect of the invention, the method includes a step of mapping the storage partitions of each storage element to one or more storage volumes within each respective storage element.

In another aspect of the invention, the method includes a step of accommodating multiple host systems with the method of processing.

In another aspect of the invention, the method includes a step of privatizing an access to the storage partitions for the host system.

In another aspect of the invention, the method includes a step of processing the requests as read and write requests to the storage partitions of each storage element.

In another aspect of the invention, the method includes a step of forming the storage partitions of each storage element.

In another aspect of the invention, the method includes a step of switching the requests with a communications switch based on the merged partitions.

In one aspect of the invention, a system processes requests of a host system to one or more storage partitions of one or more storage elements. The system includes a map processor configured for mapping the storage partitions of each storage element to generate one or more merged partitions of the storage elements. The system also includes an interface controller communicatively connected to the host system and to the map processor for processing the requests of the host system to the storage partitions of each storage element using the merged partitions.

In another aspect of the invention, each storage element includes at least one disk storage device, tape storage device, CD storage device, and/or computer memory storage device.

In another aspect of the invention, each storage element includes a storage controller configured for processing the requests of the host system.

In another aspect of the invention, the requests include read and write requests to the storage partitions.

In another aspect of the invention, the system includes additional host systems.

Advantages of the invention include an abstraction of mapping from the storage element to an interface controller, thereby, relieving the storage element of a processor intense function. Other advantages include improved storage management as a storage system increases beyond a single storage element.

BRIEF DESCRIPTION OF THE PREFERRED EMBODIMENTS

FIG. 1 is a block diagram illustrating an exemplary preferred embodiment of the invention.

FIG. 2 is a block diagram illustrating another exemplary preferred embodiment of the invention.

FIG. 3 is a flow chart diagram illustrating an exemplary preferred operation of the invention.

DETAILED DESCRIPTION OF THE PREFERRED EMBODIMENTS

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

With reference now to the figures and in particular with reference to FIG. 1, an exemplary preferred embodiment of the invention is shown in system 100. System 100 is configured for processing requests of one or more host systems, such as host systems 106 and 108, to one or more storage partitions of one or more storage elements, such as storage elements 110 and 112, within storage complex 101. Examples of the host systems include computing environments ranging from individual personal computers and workstations to large networked enterprises encompassing numerous, heterogeneous types of computing systems. The host systems may be communicatively connected to process the requests through a variety of connections. Examples of such connections include Fibre Channel (FC), Small Computer System Interface (SCSI), Internet SCSI (ISCSI), Ethernet, Infiniband, SCSI over Infiniband, SCSI Remote Direct Memory Access Protocol (SRP), piping, and/or various physical connections. Infiniband is an architecture and specification for data flow between processors and I/O devices. A variety of well-known operating systems may be employed in such computing environments depending upon the needs of particular users and enterprises. The storage partitions may include sections of storage space within the storage elements. The storage partitions are discussed in more detail in FIG. 2. The storage elements may form a storage complex that is capable of providing storage space to a plurality of host systems. System 100 includes interface controller 102 and map processor 104.

In system 100, map processor 104 is configured for mapping the storage partitions of each storage element to generate one or more merged partitions of the storage partitions of each storage element. In system 100, interface controller 102 is communicatively connected to host systems 106 and 108 and to the map processor 104 for processing the requests of host systems 106 and 108 to the storage partitions of each of storage elements 110 and 112. The number of host systems and storage elements is not intended to be limited to the number of host systems and storage elements in the embodiment. For example, interface controller 102 may be configured to receive requests from a single host system, such as host system 106, or from a plurality of host systems. Additionally, each of the host systems, such as host system 106, may represent one or more host systems. Map processor 104 may be configured to map the storage partitions of a single storage element such as storage element 110 or of a plurality of storage elements. Map processor 104 may additionally incorporate functionality of a switch, such as a telecommunications switch, to appropriately map the requests of host system 106 and 108 to the storage partitions of storage elements 110 and 112.

Each of storage elements 110 and 112 may include one or more storage volumes. For example, storage element 110 includes storage volumes 118, 119 . . . N and storage element 112 includes storage volumes 120, 121 . . . N, where N is an integer value. The storage volumes may include standard hard disk drives, such as those often found in personal computers, as well as other types of storage devices, such as optical storage, semiconductor storage (e.g., RAM disks), tape storage, et cetera. Each of storage elements 110 and 112 may include a storage controller, such as storage controllers 122 and 124, for processing requests, such as read and write requests from host systems 106 and 108. One example of a storage element, such as storage element 110, may include a RAID storage system having a storage array of computer disks. In this example, the storage controller, such as storage controller 122, may include a RAID storage controller for processing the requests of host systems 106 and 108 to the storage array.

FIG. 2 is a block diagram of system 200 in another exemplary preferred embodiment of the invention. System 200 is configured for processing requests of one or more host systems, such as host systems 206 and 208, to one or more storage partitions, such as storage partitions $203_{210}$, $205_{210}$, $203_N$, and $205_N$, of one or more storage elements, such as storage elements 210 . . . N, within storage complex 201. Additionally, host systems 206 and 208 may each represent one or more host systems. In system 200, interface controller 202 includes merged partitions $203_{210,N}$ and $205_{210,N}$, which map to storage partitions $203_{210}$, $205_{210}$, $203_N$, and $205_N$ of storage elements 210 . . . N, wherein N is an integer value. Host systems 206 and 208 may access the storage partitions through respective connections to merged partitions $203_{210,N}$ and $205_{210,N}$. The connections may include logical and/or physical maps to the merged partitions. Storage partitions $203_{210}$, $205_{210}$, $203_N$, and $205_N$ may be formed prior to use by allocating sections of storage space across one or more storage volumes. Allocation of the storage space of the storage partitions may be performed by a user, such as a system administrator. In system 200, interface controller 202 is configured for processing the requests of host systems 206 and 208 to storage partitions $203_{210}$, $205_{210}$, $203_N$, and $205_N$ using merged partitions $203_{210,N}$ and $205_{210,N}$. Each of merged partitions $203_{210,N}$ and $205_{210,N}$ may include a plurality of LUN designators that are used to process requests from a particular host system by mapping the requests to the LUNs within one or more of the storage elements. The requests may be mapped through either logical mapping and/or physical mapping. While LUNs of the partitions of each storage element are merged into the merged partitions of interface controller 202, LUN usage is not duplicated between storage elements. For example, LUN 0 of storage partition $203_{210}$ is merged into merged partition $203_{210,N}$, while LUN 0 of storage partition $205_N$ is not. Such an allocation may prevent conflicts between LUN selections by the host systems.

In system 200, storage element 210 includes storage partitions $203_{210}$ and $205_{210}$ and storage element N includes storage partitions $203_N$ and $205_N$. Partitions $203_{210}$, $205_{210}$, $203_N$, and $205_N$ may include one or more LUNs, such as LUNs 0, 1 . . . N. Each LUN may designate a private allocation of storage space for a particular host system within a particular storage partition. Each LUN may map to a LUN designator within interface controller 202. Storage partitions $203_{210}$, $205_{210}$, $203_N$, and $205_N$ should not be limited to a specific type of LUN allocation as storage partitions $203_{210}$, $205_{210}$, $203_N$, and $205_N$ may employ other types of storage space sectioning.

In system 200, storage element 210 includes array $214_{210}$ of storage volumes and storage element N includes array $215_N$ of storage volumes. Each of arrays $214_{210}$ and $215_N$ may include one or more storage volumes SV 0, SV 1 . . . SV N. In one embodiment of the invention, multiple LUNs of the storage partitions may map to one or more storage volumes. Mapping of LUNs to storage volumes may include physical and/or logical mapping. Storage volumes SV 0, SV 1 . . . SV N may include storage devices, such as standard hard disk drives as often found in personal computers, as well as other types of storage devices, such as optical storage, semiconductor storage (e.g., RAM disks), tape storage, et cetera. Arrays $214_{210}$ and $215_N$ are not intended to be limited to a number or type of storage volumes within each array. For example, storage array $214_{210}$ may include a single computer disk, while storage array $215_N$ includes a plurality of tape drives.

In system 200, access to storage elements 210 . . . N may be initiated by host systems 206 and 208. For example, host system 206 may transfer a request to merged partition $203_{210,N}$ in interface controller 202. Merged partition $203_{210,N}$ may have been generated by a map processor, such as map processor 104 of FIG. 1. Interface controller 202 may process the request to direct the request to storage partitions $203_{210}$ and/or $203_N$ of storage elements 210 and/or N, respectively. A storage controller, such as storage controller 122 of FIG. 1, of each of storage elements 210 and N may further process the request to one or more of the storage volumes, such as SV 0, SV 1 . . . SV N, of storage array $214_{210}$.

In a more specific example, host system 206 may access LUN 0 of merged partition $203_{210,N}$ within interface controller 202 using a read and/or a write request. Interface controller 202 may process (e.g., map) the request by directing the request to LUN 0 of storage partition $203_{210}$ of storage element 210. The storage controller may further process (e.g., map) the request by directing the request to storage volume SV 0 of storage array $214_{210}$. While the preceding examples of system 200 illustrate mapping and processing requests from a host system to a storage volume in accord with one embodiment of the invention, the examples are not intended to be limiting. Those skilled in the art understand that other combinations of mapping requests between a host system, such as host system 206, and a storage volume, such as SV 0 of storage array $214_{210}$, will fall within the scope of the invention.

FIG. 3 illustrates exemplary preferred operation 300 of a system, such as systems 100 and 200 of FIGS. 1 and 2, for processing requests of one or more host systems, such as host systems 206 and 208 of FIG. 2, to one or more storage partitions of one or more storage elements. The requests may include input/output requests, such as read and write requests. Operation 300 commences, in step 302. Storage volumes, such as storage volumes SV 0, SV 1 . . . SV N of storage array $214_{210}$ of FIG. 2, are implemented, in step 304. The storage volumes may map to LUNs of the storage elements such that the LUNs form storage partitions within each storage element, such as LUNs 0, 1 . . . N of storage partition $203_{210}$, in step 306. The storage volumes may be mapped by physical and/or logical connections. Examples of the storage partitions include storage partitions $203_{210}$, $205_{210}$, $203_N$, and $205_N$ of FIG. 2. The storage partitions may include sections of storage space within a storage element and may be formed by a user such as a system administrator.

A storage controller of each storage element, such as a storage controller 122 of FIG. 1, may map the storage volumes to each of the storage partitions. A map processor, such as map processor 104 of FIG. 1, maps the storage partitions of each storage element without LUN duplication across storage elements to create merged partitions, such as merged partitions $203_{210,N}$ and $205_{210,N}$ of FIG. 2, in step 308. An interface controller, such as interface controller 102 of FIG. 1, communicatively connects the merged partitions to the host systems to direct the requests of the host systems to the storage partitions of each storage element using the merged partitions, in step 310. The interface controller may privatize access to the storage partitions for each host system, in step 312. For example, the interface controller may allow access to storage partition $203_{210}$ by host system 206 through merged partition $203_{210,N}$ while excluding access to storage partition $203_{210}$ by host system 208. The storage controllers of each storage element may process the requests as read and write requests to the storage partitions within each storage element, in step 314. Operation 300 ends in step 316.

Those skilled in the art will understand that other methods can be used to transfer requests over channels that fall within the scope of the invention.

Instructions that perform the operations of FIG. 3 can be stored on storage media. The instructions can be retrieved and executed by a microprocessor. Some examples of instructions are software, program code, and firmware. Some examples of storage media are memory devices, tapes, disks, integrated circuits, and servers. The instructions are operational when executed by the microprocessor to direct the microprocessor to operate in accord with the invention. Those skilled in the art are familiar with instructions and storage media.

Advantages of the invention include an abstraction of mapping from the storage element to an interface controller, thereby, relieving the storage element of a processor intense function. Other advantages include improved storage management as a storage system increases beyond a single storage element.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed:

1. A method of processing requests of a host system on one or more storage elements, each storage element having one or more storage partitions, including steps of:

mapping the storage partitions of each storage element to generate one or more merged partitions of the storage elements wherein the step of mapping is performed within a mapping controller communicatively coupled between the hosts systems and the storage elements;

communicatively coupling the merged partitions to the host system to process the requests of the host system wherein the requests of the host systems are received by the mapping controller and wherein each request is directed to an identified merged partition mapped by the mapping controller;

generating in the mapping controller one or more corresponding I/O requests each directed from the mapping controller to a corresponding storage element that comprises a portion of the identified merged partition; and processing the requests as read and write requests to the storage partitions of each storage element wherein the processing is performed within a storage controller within each storage element and wherein the storage controller is coupled to one or more storage devices within the storage element.

2. The method of claim 1, further including a step of mapping the storage partitions of each storage element to one or more storage volumes within each respective storage element.

3. The method of claim 1, further including a step of accommodating multiple host systems each operating under control of any of multiple operating systems.

4. The method of claim 1, further including a step of privatizing access to the storage partitions for a host system such that access to one or more storage partitions is permitted only for a select subset of the multiple host systems.

5. The method of claim 1, further including a step of switching the requests with a communications switch based on the merged partitions.

6. A system for processing requests of a host system to one or more storage partitions of one or more storage elements, including:

a map processor configured for mapping the storage partitions of each storage element to generate one or more merged partitions each comprising a portion of one or more storage elements;

an interface controller communicatively connected to the host system and to the map processor for processing the requests received from the host system wherein each received request is directed to an identified merged partition; and means for processing the requests as read and write requests to the storage partitions of each storage element wherein the means for processing includes:

means in the mapping controller for generating one or more corresponding I/O requests each directed from the mapping controller to a corresponding storage element that comprises a portion of the identified merged partition; and a storage controller in each storage element for processing the I/O requests directed to said each element wherein the storage controller is coupled to one or more storage devices within the storage element.

7. The system of claim 6, the storage element including at least one of a disk storage device, tape storage device, CD storage device, and a computer memory storage device.

8. The system of claim 6, wherein the interface controller is adapted to communicate with multiple host systems each operating under control of any of multiple operating systems.

9. A system for processing requests of a host system on one or more storage partitions of one or more storage elements, including:

means for mapping the storage partitions of each storage element to generate one or more merged partitions of the storage elements wherein the means for mapping is communicatively coupled between the hosts systems and the storage elements;

means for communicatively coupling the merged partitions to the host system to process the requests of the host system wherein the requests of the host systems are received by the means for mapping and wherein each request is directed to an identified merged partition mapped by the means for mapping;

means, associated with the means for mapping, for generating one or more corresponding I/O requests each directed from the means for mapping to a corresponding storage element that comprises a portion of the identified merged partition; and means for processing the requests as read and write requests to the storage partitions of each storage element wherein the means for processing includes a storage controller within each storage element and wherein the storage controller is coupled to one or more storage devices within the storage element.

10. The system of claim 9, further including means for mapping the storage partitions of each storage element to one or more storage volumes within each respective storage element.

11. The system of claim 9, further including means for accommodating multiple host systems each operating under control of any of multiple operating systems.

12. The system of claim 9, further including means for privatizing an access to the storage partitions for a host system such that access to one or more storage partitions is permitted only for a select subset of the multiple host systems.

13. The system of claim 9, further including means for switching the requests with a communications switch based on the merged partitions.

14. A system for partitioning storage space in a storage complex adapted for coupling to one or more host systems, the system including:

means for providing at least one storage partition in each of a plurality of storage elements in the storage complex;

means, within the storage complex, for creating a merged partition within an interface controller in the storage complex, wherein said merged partition includes at least one storage partition from each of at least two storage elements; and means, within the storage complex, for processing requests from a host system as read and write requests to the storage partitions of each storage element wherein the means for processing includes:

means for receiving requests from one or more host systems each request directed to an identified merged partition of the storage complex;

means for generating one or more I/O requests directed to one or more storage elements that comprise the identified merged partition;

means for transferring the one or more I/O requests wherein the one or more storage elements; and storage controller means, within each of the one or more storage elements, for processing the received I/O requests wherein the storage controller means in each storage element is coupled to one or more storage devices within the storage element.

* * * * *